(12) United States Patent
McLaurin

(10) Patent No.: US 9,361,909 B2
(45) Date of Patent: Jun. 7, 2016

(54) INITIALIZATION OF MAGNETIC FEATURES

(71) Applicant: Seagate Technology LLC, Cupertino, CA (US)

(72) Inventor: Stephen Keith McLaurin, Sunnyvale, CA (US)

(73) Assignee: Seagate Technology LLC, Cupertino, CA (US)

( * ) Notice: Subject to any disclaimer, the term of this patent is extended or adjusted under 35 U.S.C. 154(b) by 140 days.

(21) Appl. No.: 14/055,805

(22) Filed: Oct. 16, 2013

(65) Prior Publication Data

US 2015/0015353 A1 Jan. 15, 2015

Related U.S. Application Data

(60) Provisional application No. 61/844,425, filed on Jul. 10, 2013.

(51) Int. Cl.
| | | |
|---|---|---|
| *G11B 5/03* | (2006.01) | |
| *G11B 5/024* | (2006.01) | |
| *G11B 5/012* | (2006.01) | |
| *G11B 5/02* | (2006.01) | |
| *G11B 5/74* | (2006.01) | |

(52) U.S. Cl.
CPC .............. *G11B 5/0245* (2013.01); *G11B 5/012* (2013.01); *G11B 5/02* (2013.01); *G11B 5/024* (2013.01); *G11B 5/746* (2013.01)

(58) Field of Classification Search
None
See application file for complete search history.

(56) References Cited

U.S. PATENT DOCUMENTS

| | | | |
|---|---|---|---|
| 5,321,563 A * | 6/1994 | Sanford et al. | 360/66 |
| 6,791,774 B1 * | 9/2004 | Albrecht et al. | 360/17 |
| 8,289,818 B2 | 10/2012 | Taratorin et al. | |
| 2002/0101684 A1* | 8/2002 | Saito | G11B 5/00 360/55 |
| 2006/0022668 A1* | 2/2006 | Yamamoto | 324/210 |
| 2008/0074784 A1* | 3/2008 | Aoyama | 360/125.02 |
| 2008/0100942 A1* | 5/2008 | Meier | B82Y 25/00 360/31 |
| 2010/0170017 A1* | 7/2010 | Heidmann | 850/48 |
| 2012/0092793 A1* | 4/2012 | Rubin et al. | 360/135 |
| 2012/0092972 A1* | 4/2012 | Taratorin et al. | 369/13.29 |

FOREIGN PATENT DOCUMENTS

JP 2000056712 A * 2/2000 ............. G09F 9/37

* cited by examiner

*Primary Examiner* — Tan X Dinh

(57) ABSTRACT

The embodiments disclose an alternating current (AC) erase process configured to cancel out existing polarity of stack magnetic features on both sides of the stack and an AC reset process configured to initialize the polarity of the device stack magnetic features of both sides of a stack configured to create a uniform polarity.

19 Claims, 9 Drawing Sheets

INITIALIZATION OF MAGNETIC FEATURES

CROSS-REFERENCE TO RELATED APPLICATIONS

This application claims the benefit of U.S. Provisional Patent Application Ser. No. 61/844,425 filed Jul. 10, 2013, entitled "A METHOD OF AC SIMULTANEOUS INITIALIZATION OF MAGNETIC FEATURES", by McLaurin, et al.

DETAILED DESCRIPTION

In a following description, reference is made to the accompanying drawings, which form a part hereof, and in which is shown by way of illustration a specific example in which the embodiments may be practiced. It is to be understood that other embodiments may be utilized and structural changes may be made without departing from the scope.

General Overview:

It should be noted that the descriptions that follow, for example, in terms of a method for AC simultaneous initialization of magnetic features is described for illustrative purposes and the underlying system can apply to any number and multiple types of magnetic stacks. In one embodiment, the method for AC simultaneous initialization of magnetic features can be configured using multiple magnets. The method for AC simultaneous initialization of magnetic features can be configured to include an AC erase process and can be configured to include an AC reset process.

DETAILED DESCRIPTION

Figure 1:
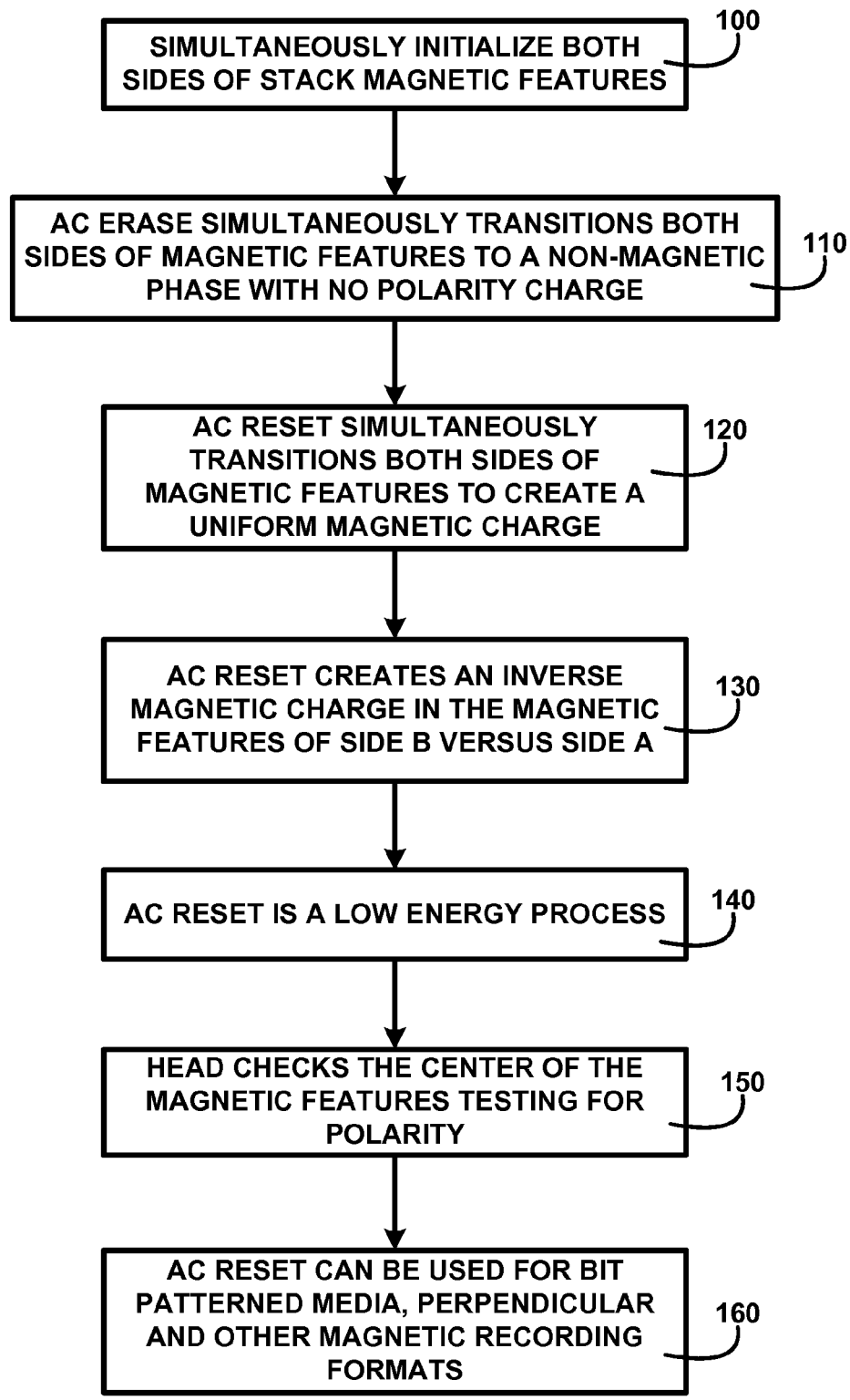
FIG. 1 shows a block diagram of an overview of a method for AC simultaneous initialization of magnetic features of one embodiment.

FIG. 1 shows a block diagram of an overview of a method for alternating current (AC) simultaneous initialization of magnetic features of one embodiment. FIG. 1 shows a method for AC simultaneous initialization of magnetic features used to simultaneously initialize both sides of stack magnetic features 100. The initialization processing begins where an AC erase simultaneously transitions both sides of magnetic features to a non-magnetic phase with no polarity charge 110. Using the AC erase simultaneously on both sides of a stack magnetic features cancels out the existing polarity. An AC reset simultaneously transitions both sides of magnetic features to create a uniform magnetic charge 120 producing a uniform polarity in the magnetic features of a stack. The AC reset creates an inverse magnetic charge in the magnetic features of side B versus side A 130. AC reset is a low energy process 140. Upon completion of the AC reset testing is done where a head checks the center of the magnetic features testing for polarity 150. An AC reset can be used for bit patterned media, perpendicular and other magnetic recording formats 160.

Figure 2:
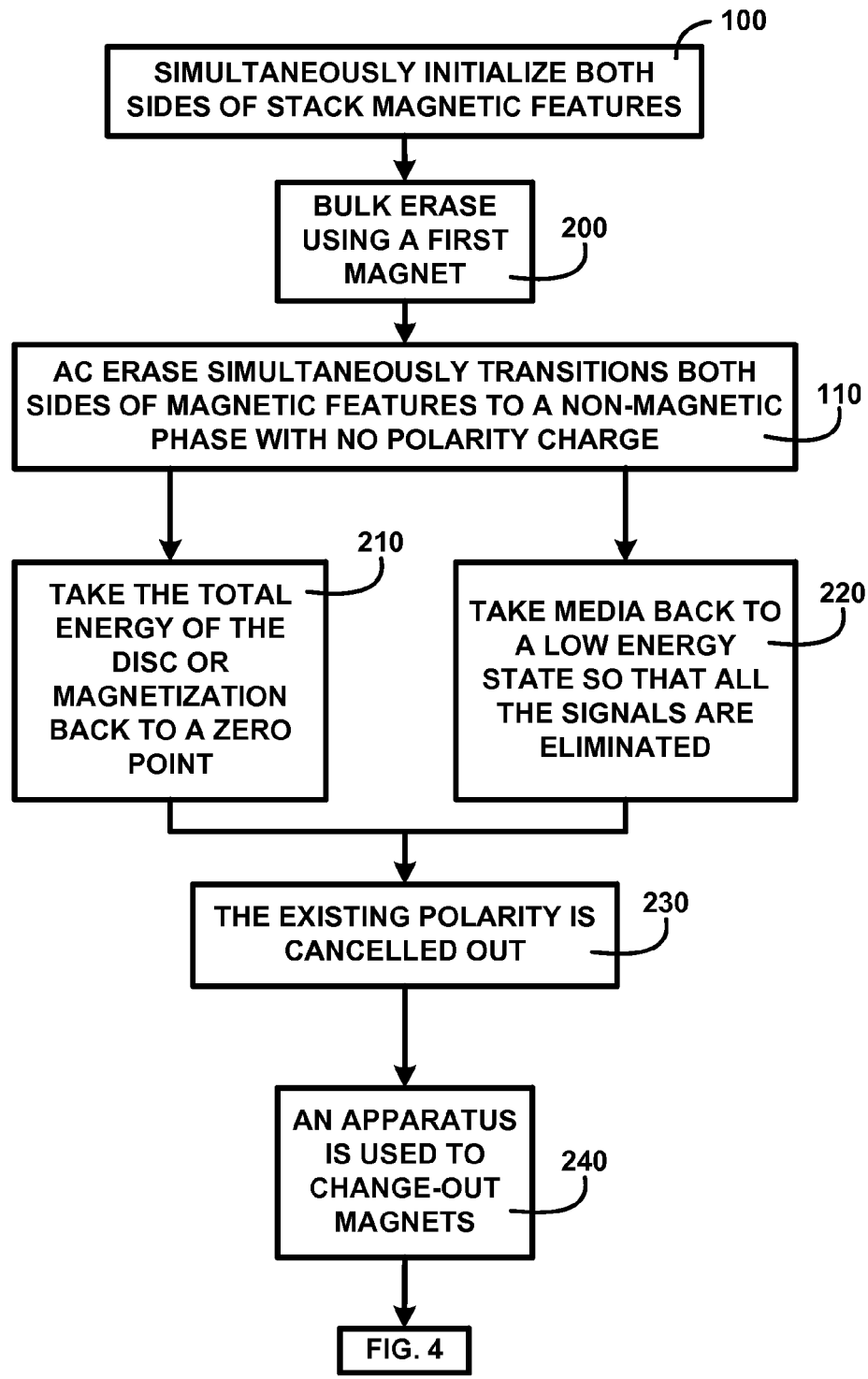
FIG. 2 shows a block diagram of an overview flow chart of a method for AC simultaneous initialization of magnetic features of one embodiment.

FIG. 2 shows a block diagram of an overview flow chart of a method for AC simultaneous initialization of magnetic features of one embodiment. FIG. 2 shows processes that simultaneously initialize both sides of stack magnetic features 100. The processes include a bulk erase using a first magnet 200 including a process wherein an AC erase simultaneously transitions both sides of magnetic features to a non-magnetic phase with no polarity charge 110. The AC erase is used to take the total energy of the disc or magnetization back to a zero point 210. The AC erase is used to take media back to a low energy state so that all the signals are eliminated 220 where the existing polarity is cancelled out 230. Upon completion of the AC erase an apparatus is used to change-out magnets 240. Descriptions of subsequent processes are shown in FIG. 4.

Figure 3:
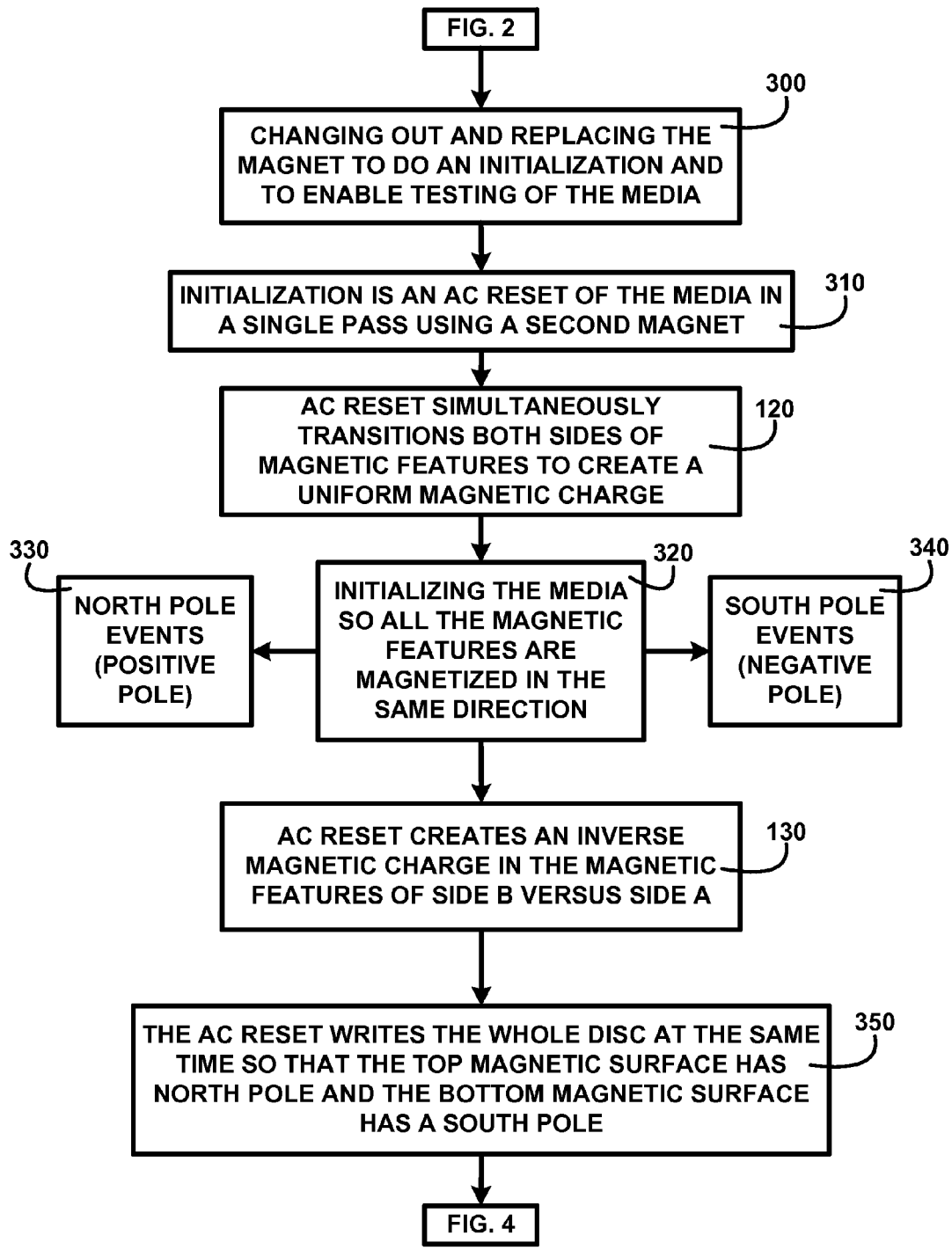
FIG. 3 shows a block diagram of an overview flow chart of an AC reset creating a uniform inverse magnetic charge in the both sides of magnetic features of one embodiment.

FIG. 3 shows a block diagram of an overview flow chart of an AC reset creating a uniform inverse magnetic charge in the both sides of magnetic features of one embodiment. FIG. 3 shows a continuation from FIG. 2 of changing out and replacing the first magnet to do an initialization and to enable testing of the media 300. An initialization is an AC reset of the media in a single pass using a second magnet 310. An AC reset simultaneously transitions both sides of magnetic features to create a uniform magnetic charge 120.

The AC reset is used for initializing the media so all the magnetic features are magnetized in the same direction 320 where north pole events (positive pole) 330 and south pole events (negative pole) 340 create a uniform polarity. The AC reset creates a uniform inverse magnetic charge in the magnetic features of side A versus side B 130. The AC reset writes the whole disc at the same time so that the top magnetic surface has a north pole and the bottom magnetic surface has a south pole 350. The processing is further described in FIG. 4.

Figure 4:
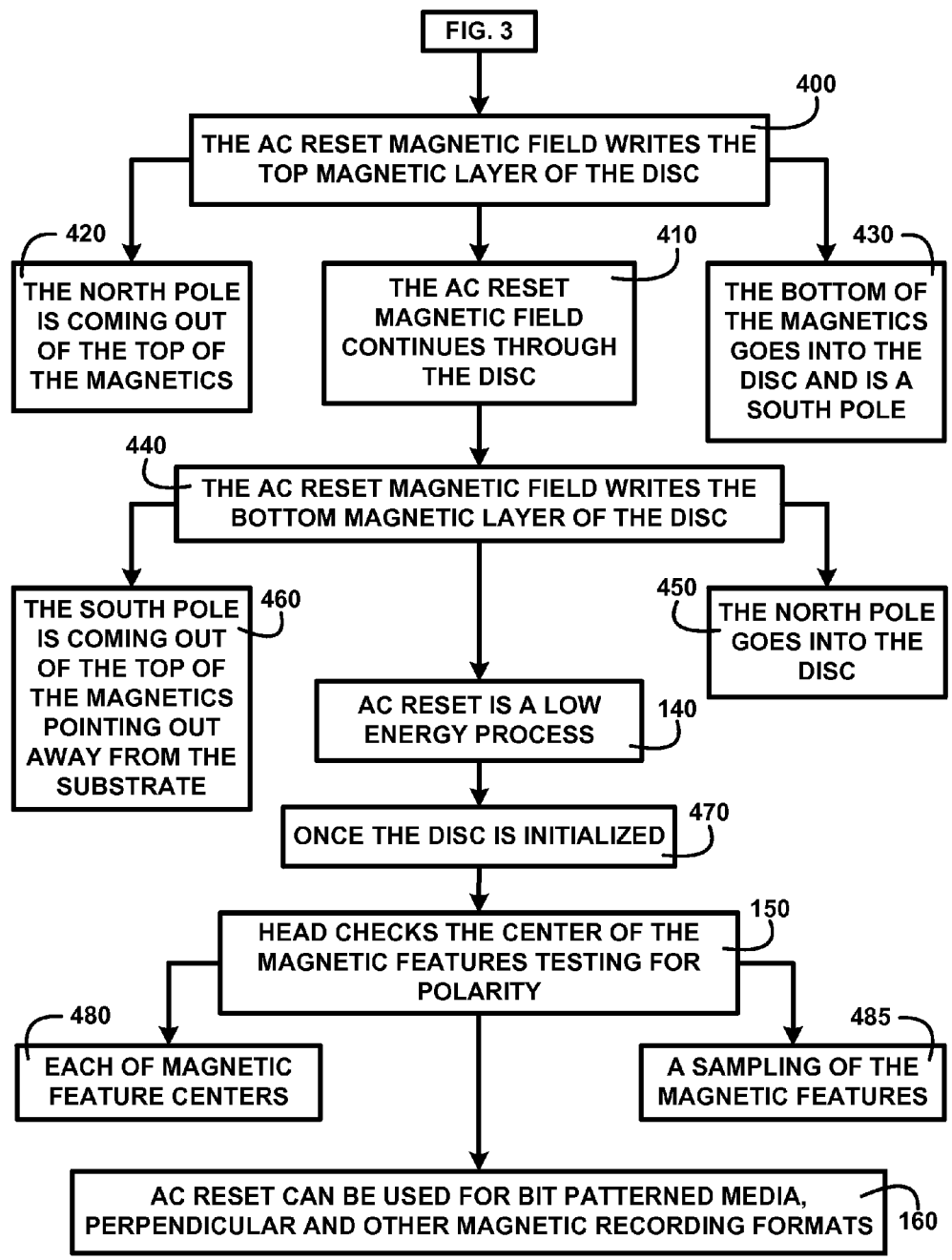
FIG. 4 shows a block diagram of an overview flow chart of testing magnetic features for polarity of one embodiment.

FIG. 4 shows a block diagram of an overview flow chart of testing magnetic features for polarity of one embodiment. FIG. 4 shows processing continuing from FIG. 3 including a process where the AC reset magnetic field writes the top magnetic layer of the disc 400. The AC reset sets the polarity where the north pole is coming out of the top of the magnetics 420 and the bottom of the magnetics goes into the disc and is a south pole 430 of the magnetic features.

The AC reset magnetic field continues through the disc 410 at the same time. The AC reset magnetic field writes the bottom magnetic layer of the disc 440. The AC reset produces a uniform polarity where the south pole is coming out of the top of the magnetics pointing out away from the substrate 460 and the north pole goes into the disc 450. The polarity of the magnetic features is oriented in a uniform pattern that appears inverted in the stack structure. The AC reset is a low energy process 140 using a magnet to produce the magnetic polarity in the magnetic features.

Once the disc is initialized 470 a process continues using a head to check the center of the magnetic features testing for polarity 150. The polarity testing can for example be performed on each of magnetic feature centers 480 or alternatively on a sampling of the magnetic features 485. The AC reset can be used for bit patterned media, perpendicular and other magnetic recording formats 160. Bit patterned media (BPM) includes magnetic features (dots).

Figure 5:
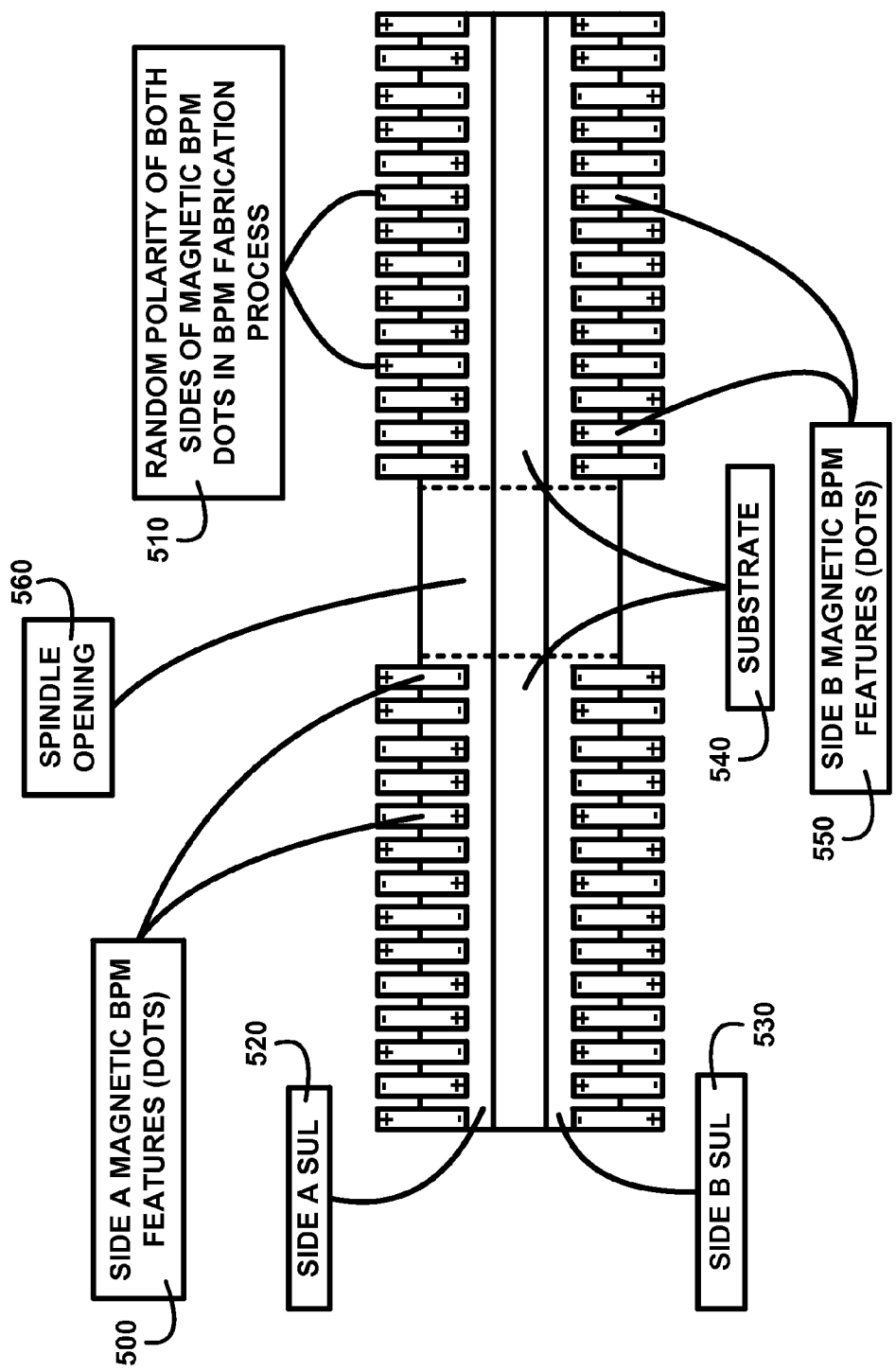
FIG. 5 shows for illustrative purposes only an example of random polarity of BPM dots of one embodiment.

FIG. 5 shows for illustrative purposes only an example of random polarity of BPM dots of one embodiment. FIG. 5 shows side A magnetic BPM features (dots) 500 and side B magnetic BPM features (dots) 550 of a BPM stack. Stack fabrication can include a soft underlayer (SUL) below the one or more magnetic layer of magnetic materials used to create magnetic features including BPM dots. The dots are the magnetic features fabricated on a substrate 540, side A SUL 520 and side B SUL 530 of the BPM stack. A spindle opening 560 is the location of the BPM stack used to mount the stack on disc drive devices to for example process the AC erase and AC reset. Random polarity of both sides of magnetic BPM dots in BPM fabrication process 510 leaves the BPM stack in a magnetic state that would prevent normal read write functions.

Figure 6:
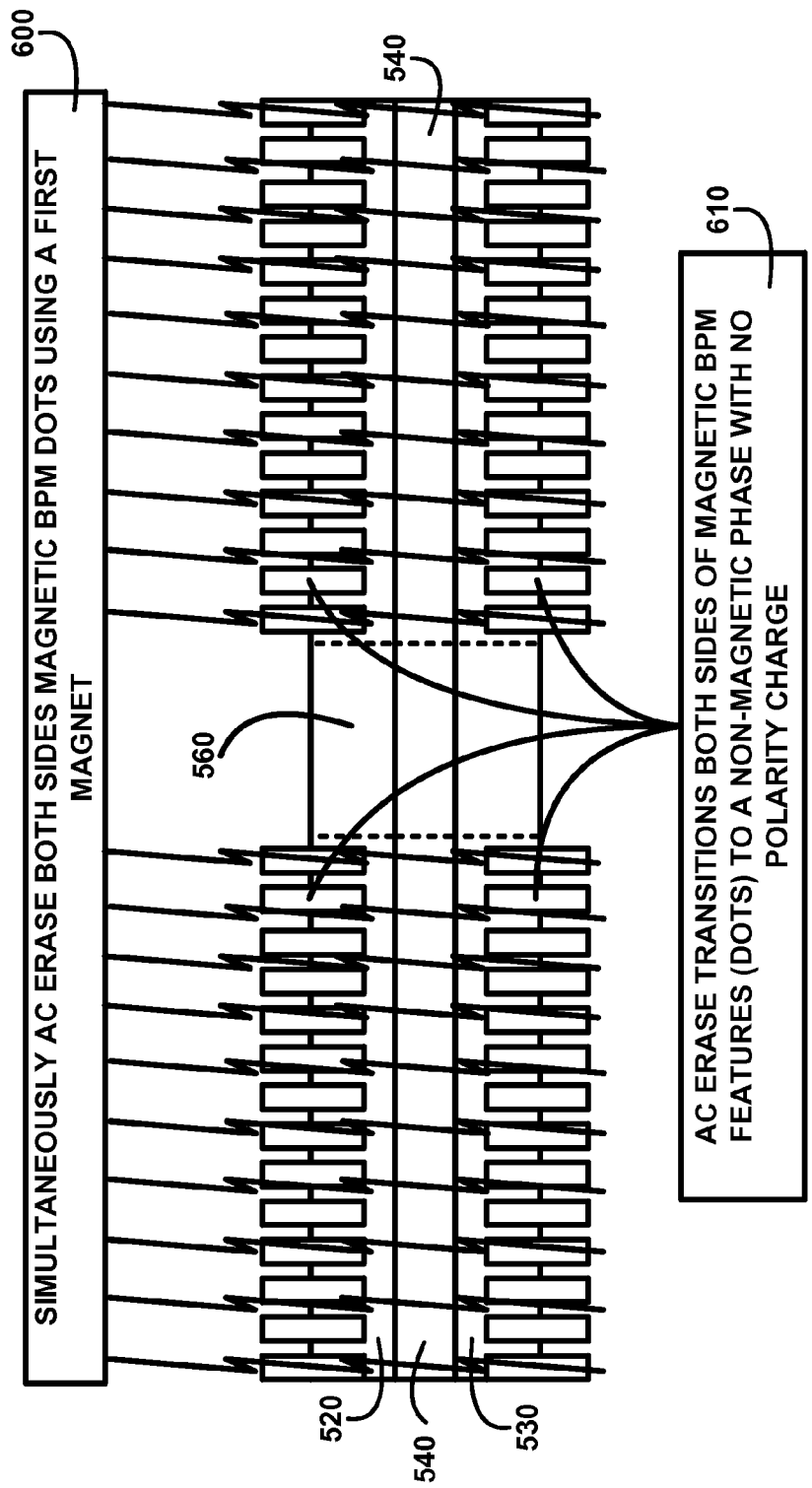
FIG. 6 shows for illustrative purposes only an example of a simultaneous AC erase of one embodiment.

FIG. 6 shows for illustrative purposes only an example of a simultaneous AC erase of one embodiment. FIG. 6 shows a BPM stack including the substrate 540, side A SUL 520, side B SUL 530 and spindle opening 560. A process is used to simultaneously AC erase both sides magnetic BPM dots using a first magnet 600. An AC erase transitions both sides of magnetic BPM features (dots) to a non-magnetic phase with no polarity charge 610. The AC erase simultaneously cancels out the existing polarity of both sides of magnetic BPM features (dots). The AC erase processes the side A magnetic BPM features (dots) 500 of FIG. 5 and side B magnetic BPM features (dots) 550 of FIG. 5 to a low energy state so that all the signals are eliminated. The total energy of the BPM stack magnetization is taken to a zero point to cancel out the existing polarity.

Figure 7:
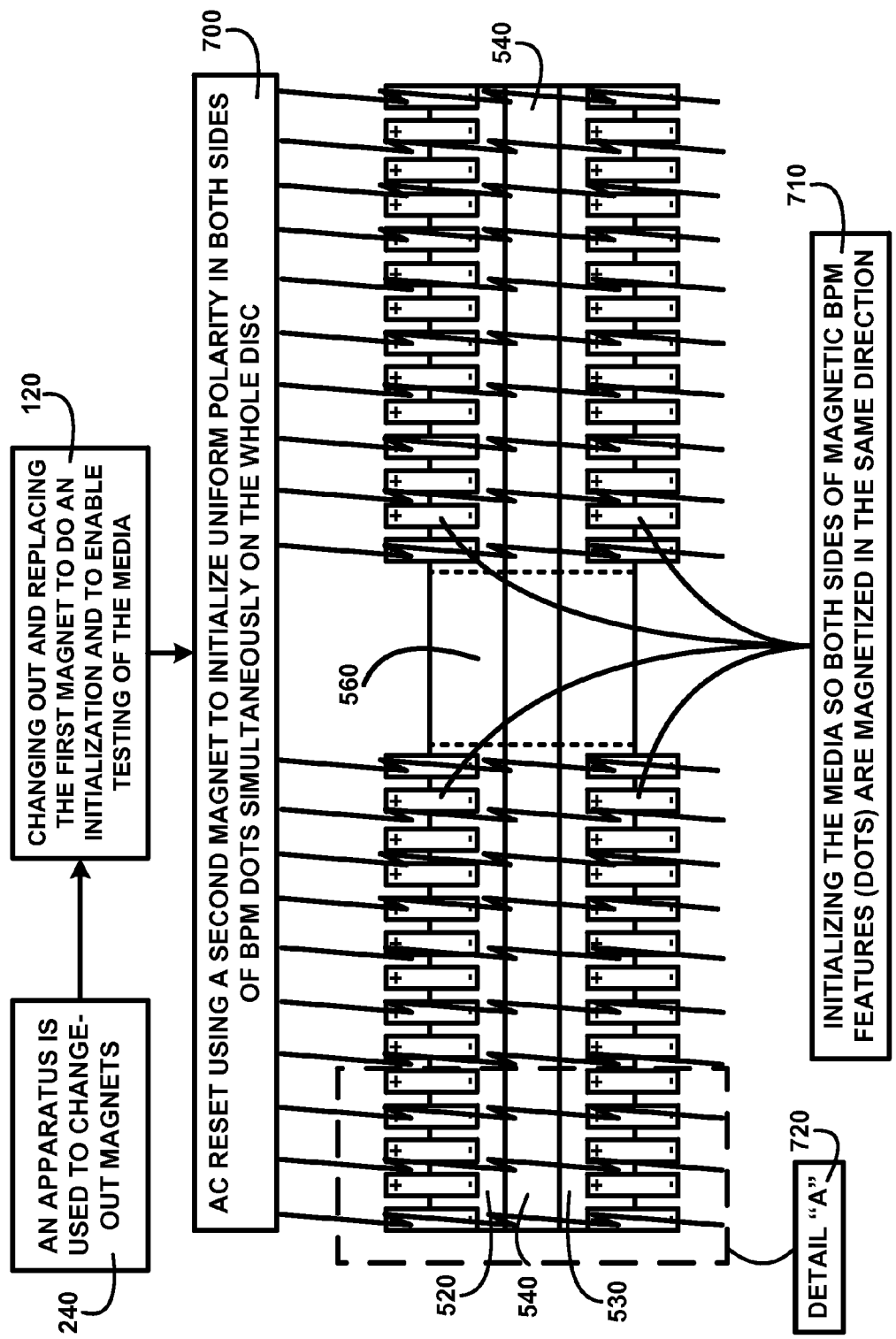
FIG. 7 shows for illustrative purposes only an example of AC reset simultaneous initialization of one embodiment.

FIG. 7 shows for illustrative purposes only an example of AC reset simultaneous initialization of one embodiment. FIG. 7 shows the substrate 540, side A SUL 520 and side B SUL 530 of a BPM stack with a spindle opening 560. An AC reset using a second magnet to initialize uniform polarity in both sides of BPM dots simultaneously on the whole disc 700 is used for initializing the media so both sides of magnetic BPM features (dots) are magnetized in the same direction 710 at the same time. Side A magnetic BPM features (dots) 500 of FIG. 5 and side B magnetic BPM features (dots) 550 of FIG. 5 have been re-magnetized with a uniform polarity wherein the dots are magnetized in the same direction. Detail "A" 720 is shown in FIG. 8 and FIG. 9.

Figure 8:
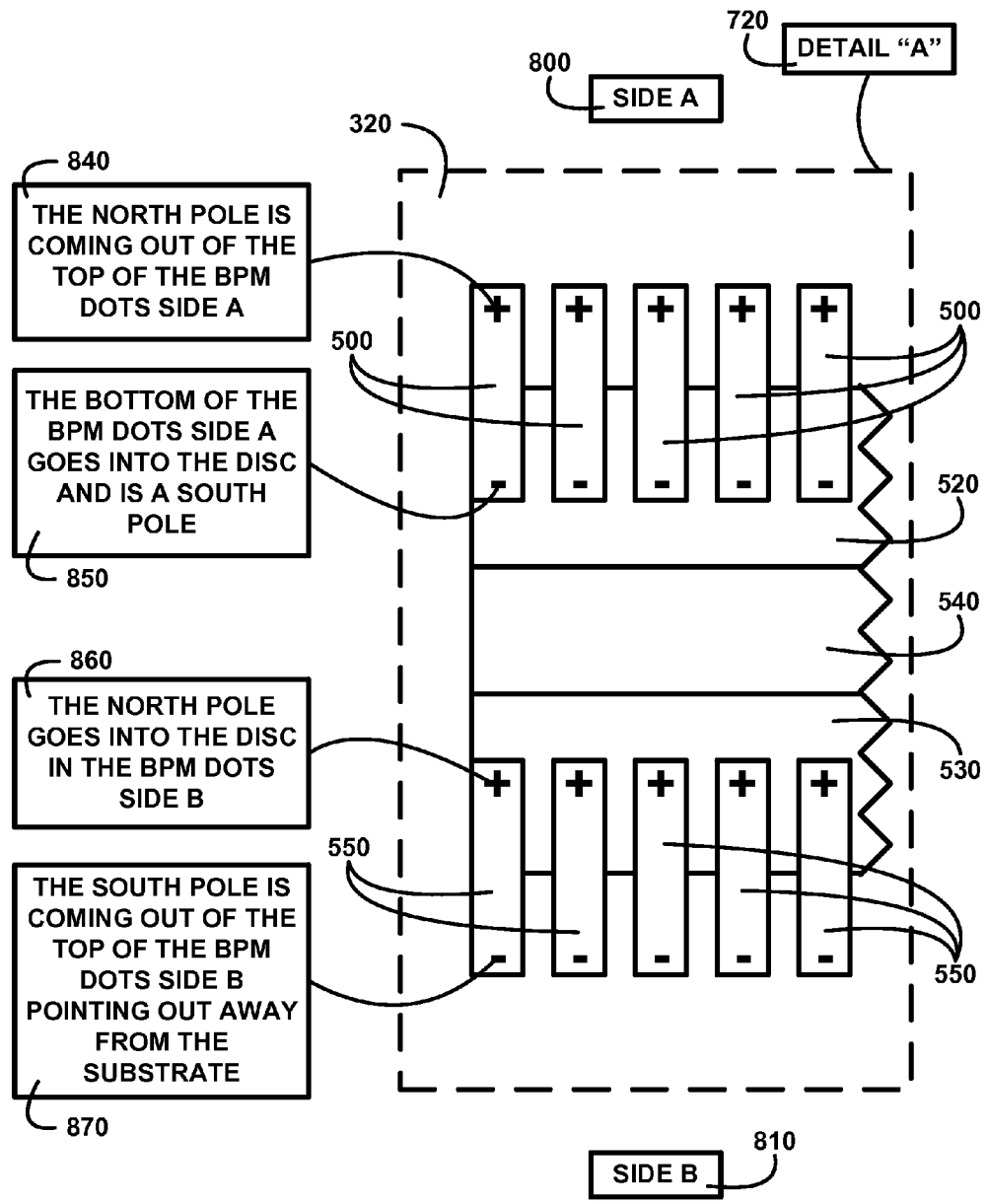
FIG. 8 shows for illustrative purposes only an example of AC reset inverse polarity of one embodiment.

FIG. 8 shows for illustrative purposes only an example of AC reset inverse polarity of one embodiment. FIG. 8 shows the substrate 540, side A SUL 520 and side B SUL 530 in detail "A" 720. FIG. 8 shows a side A 800 that includes a plurality of side A magnetic BPM features (dots) 500. The AC reset has created uniform polarity on the whole disc including the side A magnetic BPM features (dots) 500. The AC reset is used for initializing the media so all the magnetic features are magnetized in the same direction 320. The reset polarity of the side A magnetic BPM features (dots) 500 shows the north pole is coming out of the top of the BPM dots side A 840 and the bottom of the BPM dots side A goes into the disc and is a south pole 850. Shown in FIG. is a side B 810 that includes a plurality of side B magnetic BPM features (dots) 550. The AC reset inverse polarity shows the north pole oriented towards the disc in the BPM dots side B 860 and the south pole is coming out of the top of the BPM dots side B pointing out away from the substrate 870 of one embodiment.

Figure 9:
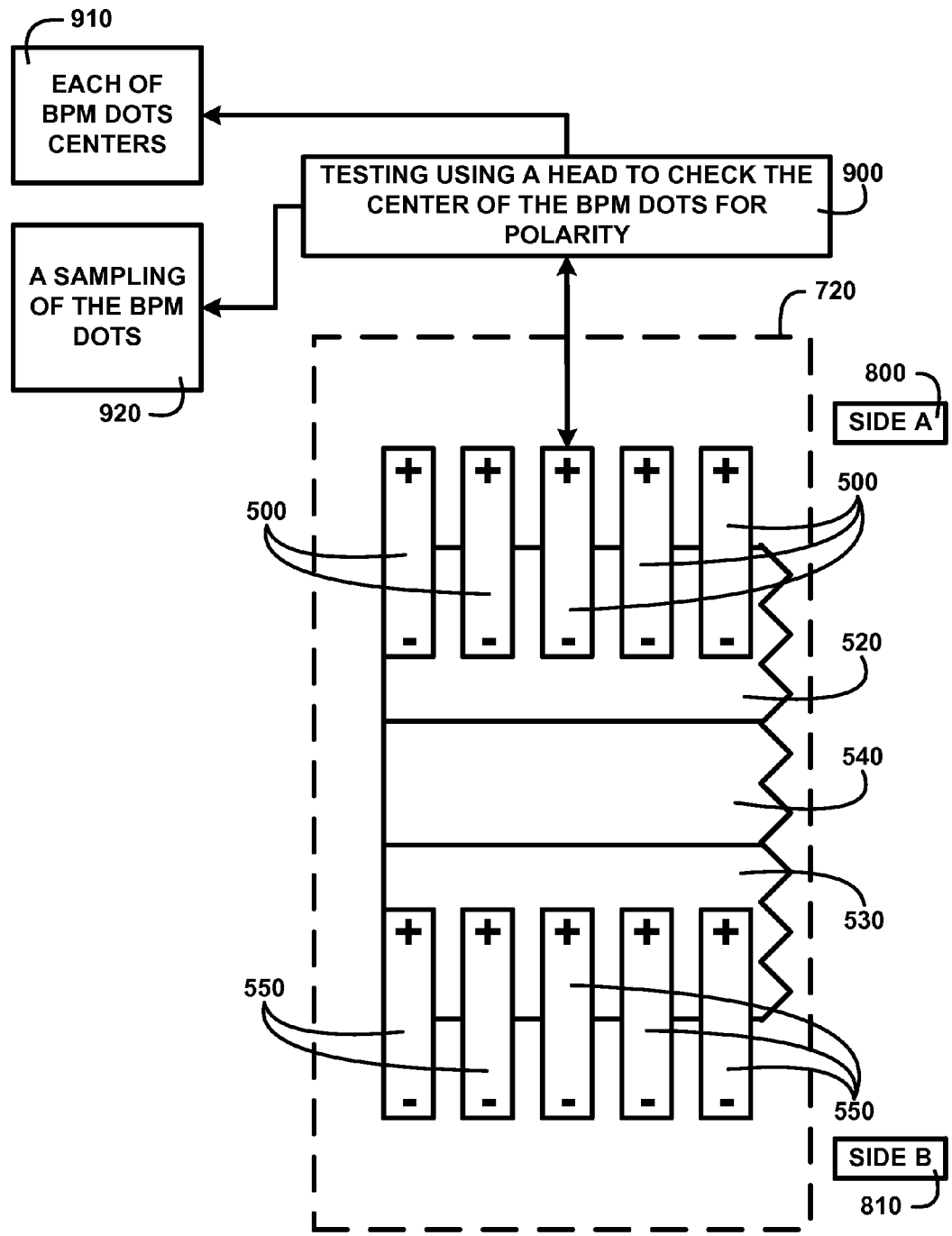
FIG. 9 shows for illustrative purposes only an example of testing BPM dots for polarity of one embodiment.

FIG. 9 shows for illustrative purposes only an example of testing BPM dots for polarity of one embodiment. FIG. 9 shows the substrate 540, side A SUL 520 and side B SUL 530 of detail "A" 720. Side A 800 and side B 810 have a plurality of side A magnetic BPM features (dots) 500 and side B magnetic BPM features (dots) 550 respectively. Testing using a head to check the center of the BPM dots for polarity 900 can be done on each of BPM dots centers and alternatively on a sampling of the BPM dots 920 of one embodiment.

The foregoing has described the principles, embodiments and modes of operation. However, the invention should not be construed as being limited to the particular embodiments discussed. The above described embodiments should be regarded as illustrative rather than restrictive, and it should be appreciated that variations may be made in those embodiments by workers skilled in the art without departing from the scope as defined by the following claims.

What is claimed is:

1. A method for simultaneous initialization of magnetic features, comprising:
    erasing a polarity of stack magnetic features on both sides of a stack using an alternating current (AC) erase process; and
    initializing the polarity of the stack magnetic features of both sides of the stack using an AC reset to create a uniform polarity.

2. The method of claim 1, further comprising using the AC erase process simultaneously on both sides of the stack magnetic features to cancel out the existing polarity using a first magnet.

3. The method of claim 1, further comprising changing out and replacing a first magnet with a second magnet.

4. The method of claim 1, wherein the AC reset includes initializing wherein all the magnetic features are magnetized in a same direction on both sides of the stack simultaneously using a second magnet.

5. The method of claim 1, wherein the AC erase includes taking total energy of the stack including a disc or magnetization back to a zero point.

6. The method of claim 1, wherein the AC erase includes taking media back to a low energy state for eliminating all signals.

7. The method of claim 1, wherein the stack comprises a bit patterned media, perpendicular, or other magnetic recording formats.

8. The method of claim 1, further comprising testing the polarity of centers of the stack magnetic features using a second magnet.

9. The method of claim 8, wherein the testing of the polarity of the centers of the stack magnetic features includes checking each magnetic feature center.

10. The method of claim 8, wherein testing the polarity of the centers of the stack magnetic features includes checking a sampling of the magnetic features including bit patterned media features.

11. A method comprising:
    transitioning a polarity of a plurality of magnetic features from a current polarity to a non-magnetic phase using an alternating current (AC); and
    initializing the polarity of the plurality of magnetic features from the non-magnetic phase to a uniform polarity in a single pass, wherein the initializing comprises applying an AC reset process that is configured to set a magnetization of the plurality of magnetic features in a same direction.

12. The method of claim 11, wherein the plurality of magnetic features is in a magnetic layer on a first and second side of a substrate.

13. The apparatus of claim 12, wherein a south pole of magnetic features of the plurality of magnetic features on the first side of the substrate and a north pole of magnetic features of the plurality of magnetic features on the second side of the substrate are directed toward the substrate.

14. The method of claim 11, wherein the transitioning comprises applying an alternating current (AC) erase process that is configured to set a magnetization of the plurality of magnetic features to a zero point.

15. A method comprising:
canceling a polarity of a plurality of magnetic features of a magnetic layer on a first and second sides of a substrate by applying an alternating current (AC) to the substrate, wherein the canceling initializes the polarity of the plurality of magnetic features to a non-magnetic phase, and wherein the initializing comprises applying an AC reset process that is configured to set a magnetization of the plurality of magnetic features in a same direction; and
magnetizing the plurality of magnetic features from the non-magnetic phase, wherein magnetic features of the plurality of magnetic features on the first side has a same polarity as magnetic features of the plurality of magnetic features on the second side.

16. The method of claim 15, wherein the magnetizing causes a substantially uniform polarization of the plurality of magnetic features.

17. The method of claim 15, wherein the magnetizing comprises performing a single pass with a magnet.

18. The method of claim 15, wherein the canceling transitions the plurality of magnetic features to a low energy state wherein all signals are eliminated in the plurality of magnetic features on the first and second sides of substrate substantially simultaneously.

19. The method of claim 15, wherein the plurality of magnetic features has a substantially random polarization prior to the canceling.

* * * * *